Figure 1:
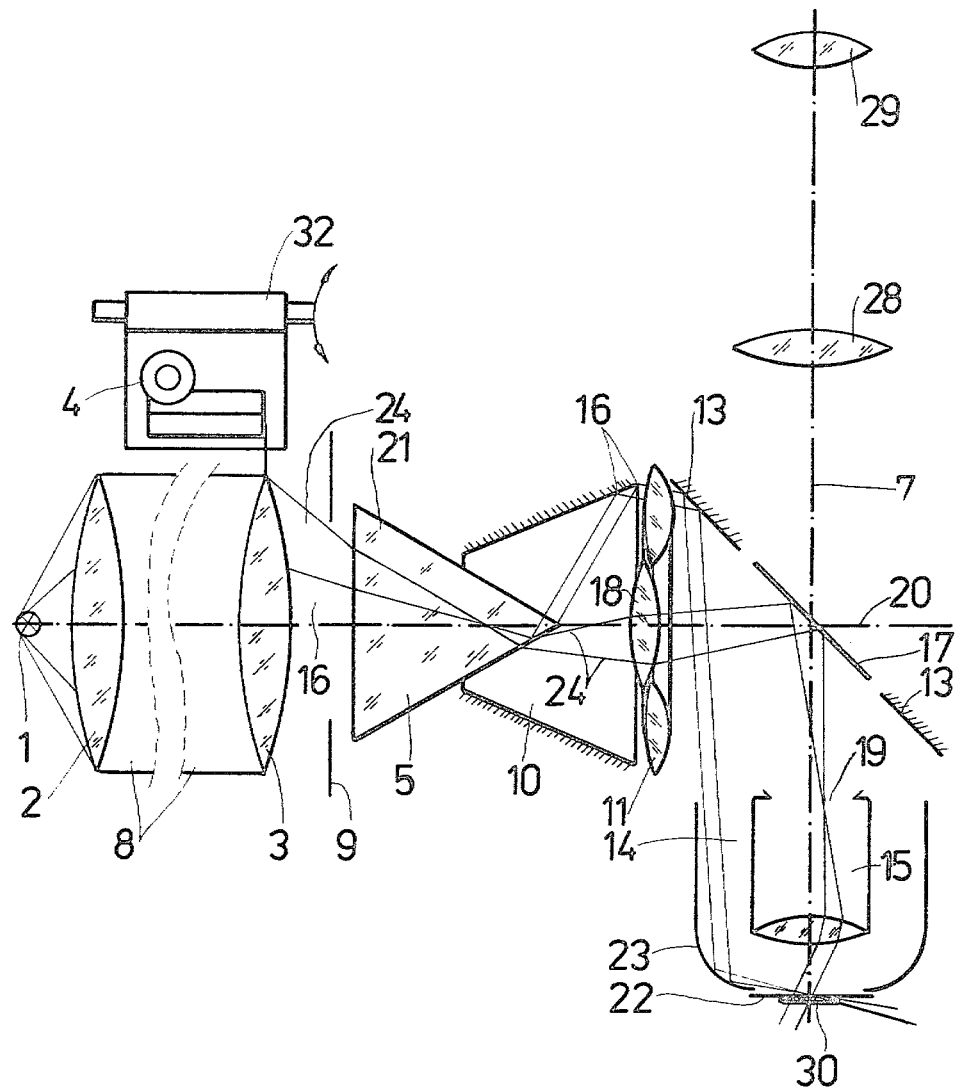

United States Patent [19]

Grosser

[11] 4,317,613
[45] Mar. 2, 1982

[54] ILLUMINATION ARRANGEMENT FOR MICROSCOPES

[76] Inventor: Johannes Grosser, 12, Ziegelm',uml/u/ hlenweg, Jena, district of Gera, German Democratic Rep.

[21] Appl. No.: 171,989

[22] Filed: Aug. 4, 1980

[30] Foreign Application Priority Data

Aug. 27, 1979 [DD] German Democratic Rep. .... 215184

[51] Int. Cl.³ .................... G02B 21/10; G02B 21/14
[52] U.S. Cl. .................................. 350/89; 350/91
[58] Field of Search ............... 350/91, 89, 90, 87, 350/88, 13, 12

[56] References Cited

U.S. PATENT DOCUMENTS

| | | | |
|---|---|---|---|
| 1,943,510 | 1/1934 | Bauersfeld et al. | 350/91 |
| 3,930,713 | 1/1976 | Stankewitz et al. | 350/91 |
| 4,127,318 | 11/1978 | Determann et al. | 350/91 |

FOREIGN PATENT DOCUMENTS 720900  4/1942  Fed. Rep. of Germany ........ 350/91

*Primary Examiner*—Jon W. Henry

[57] ABSTRACT

The invention relates to an arrangement for simultaneous dark field and phase contrast illumination of microscopic samples in which a bundle of beams from a light source is totally reflected at a shell of an optical cone and directed to the sample via respective means. By insertion of a system for aperture increase between the light source and the collimating lens on the one hand and the optical cone, on the other hand a phase contrast illumination is obtained.

Thus the severely inclined beams with respect to the base face of the optical cone are refracted and directed into a phase ring plane of the sample, and the weakly inclined beams are totally reflected and used for dark field illumination.

8 Claims, 4 Drawing Figures

ILLUMINATION ARRANGEMENT FOR MICROSCOPES

The invention relates to an arrangement for illuminating microscopic samples in reflected and incident light operation, and for performing a simultaneous and alternating dark field and annular illumination for bright field and phase contrast observations, respectively. A previous technical solution of a dark-field condenser lens is constituted of a bi-reflecting condenser including two differently curved spheric faces.

Said condenser lens is disadvantageous since the central range of a bundle of light originating from the collimating lens cannot be utilized.

Furthermore, only a dark field illumination of none too large object fields is feasible.

Another solution offers the Heine condenser lens, where the dark-field illumination is also carried out by a bireflecting system, where a further plane reflecting face serves to utilize partially the central range of a bundle of beams originating from the collimating lens for a central and peripheric, respectively, bright field and phase contrast illumination.

This condenser has the advantage that a fast change-over between central bright field, phase contast, peripheric bright field or dark-field illumination is feasible. The change-over is executed by displacing the entire reflecting members so that damages to the objective cannot be eliminated.

A simultaneous setting of dark-field and phase contrast illumination is not feasible. Furthermore, only one phase ring can be illuminated.

The previous illumination arrangements for dark-field operation under reflected light do not permit to utilize the entire light from the collimator lens, since no discontinuity reflection faces are used. This and the fact that no beam splitting by an aperture takes place are the reasons why the dark-field and the phase contrast are not feasible at the same time.

It is an object of the present invention to obviate the above disadvantages.

It is a further object of the invention to provide an illumination arrangement for reflected light and incident light operation of a microscope at a fast change-over between the illumination kinds of central bright-field, central phase-contrast, peripheric bright-field and peripheric dark-field.

It is still a further object of the invention to provide an illumination arrangement which permits shading of superimposed images and a simultaneous setting of dark-field illumination and phase contrast illumination. It is still a further object of the invention to illuminate considerably large object fields at dark-field, and to entirely exploite the light bundle originating from the collimator lens.

These and other objects are realised by an illumination arrangement for microscopes to perform dark-field and/or annular illumination of microscopic samples, characterised in that a system for aperture increase, an iris diaphragm, an optical cone, a toroidal reflecting face and an imaging system or an objective are arranged between a collimating lens of the microscope and a phase ring plane. The entire bundle of beams originating from a light source and directed by the collimating lens is rotation symmetrically deviated at the cone shell where it is subject to total reflection and is subsequently reflected via the toroidal reflecting face to the object in the event of reflected light operation, or in the event of incident light operation to the annular reflector for dark-field illumination. The toroidal reflecting face has a radius of curvature at infinity, that is, it is a conic reflecting face. By insertion of a system to increase the aperture, such as a positive lens or a truncated cone the total reflection at the cone shell is partially eliminated. These beams pass the cone as refracted ones and are subsequently focused by a collimating system into the phase ring plane of the objective.

Thus the path of beams for phase contrast illumination is directed by a system for increasing the aperture, a rotation symmetrical deflecting system and a collimating system.

In the reflected light operation the collecting function is substantially performed by the objective, whereas under incident light an additional system is used. The aperture variation for the bundle of beams originating from the collimating lens opens a second illumination channel for lower illumination apertures with respect to severely inclined beams.

Thus two different channels for illuminating the object can become effective simultaneously in addition to the one-channel system which rotation symmetrically directs the beams.

The displacement of the system for aperture increase along the opitcal axis permits an illumination of a sample with different annular apertures. Moreover, a revolving diaphragm which has to be operated with each objective change is superfluous. Still a further advantage is that the light for illumination can be far better exploited.

Figure 2:
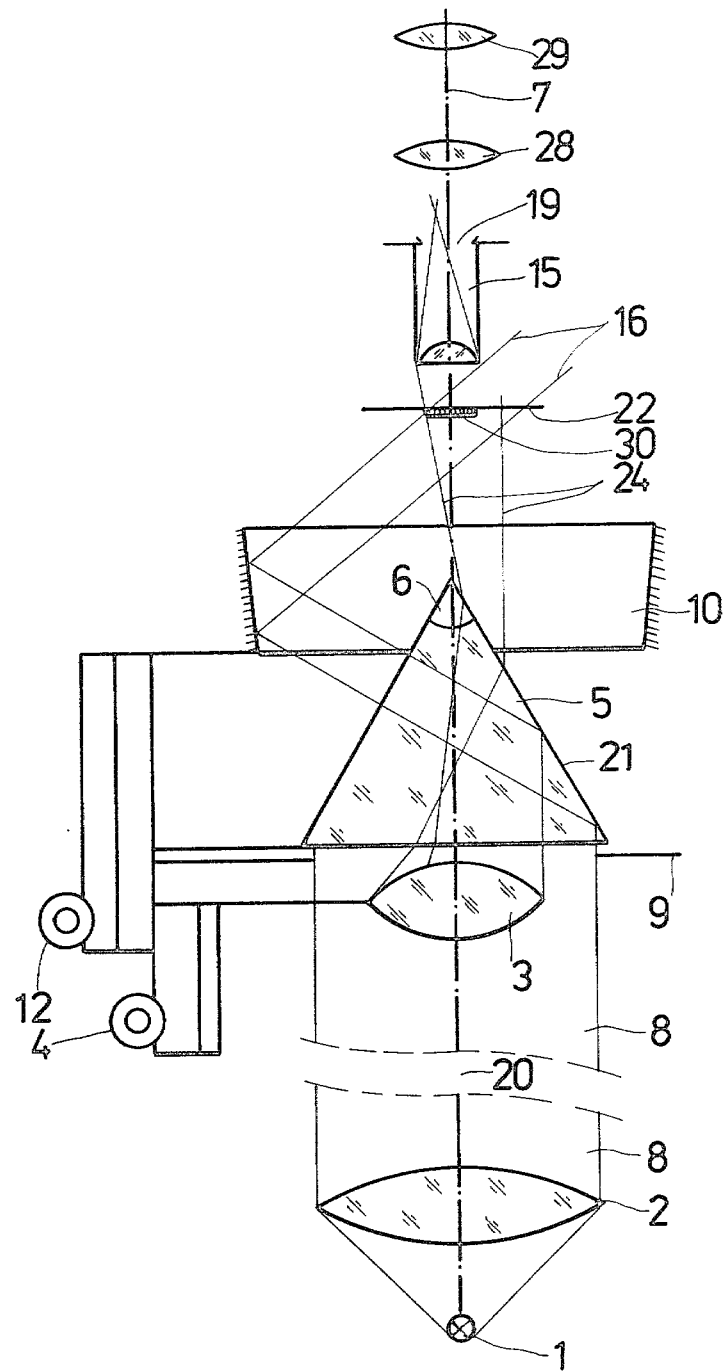
Figure 3:
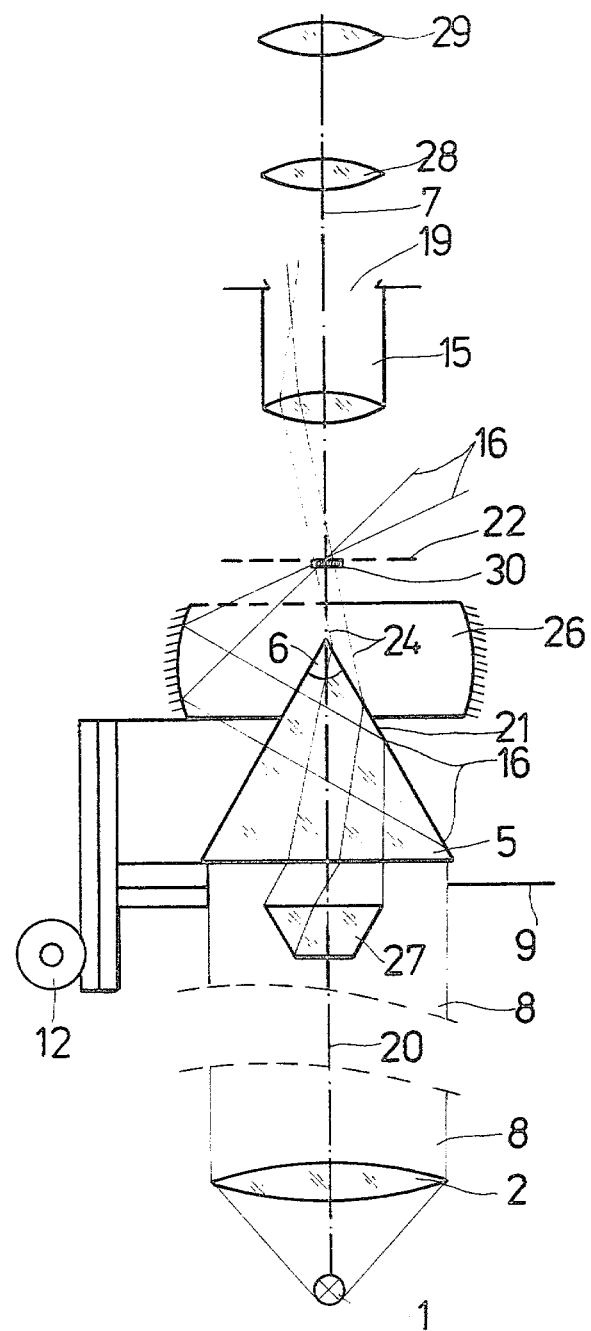
Figure 4:
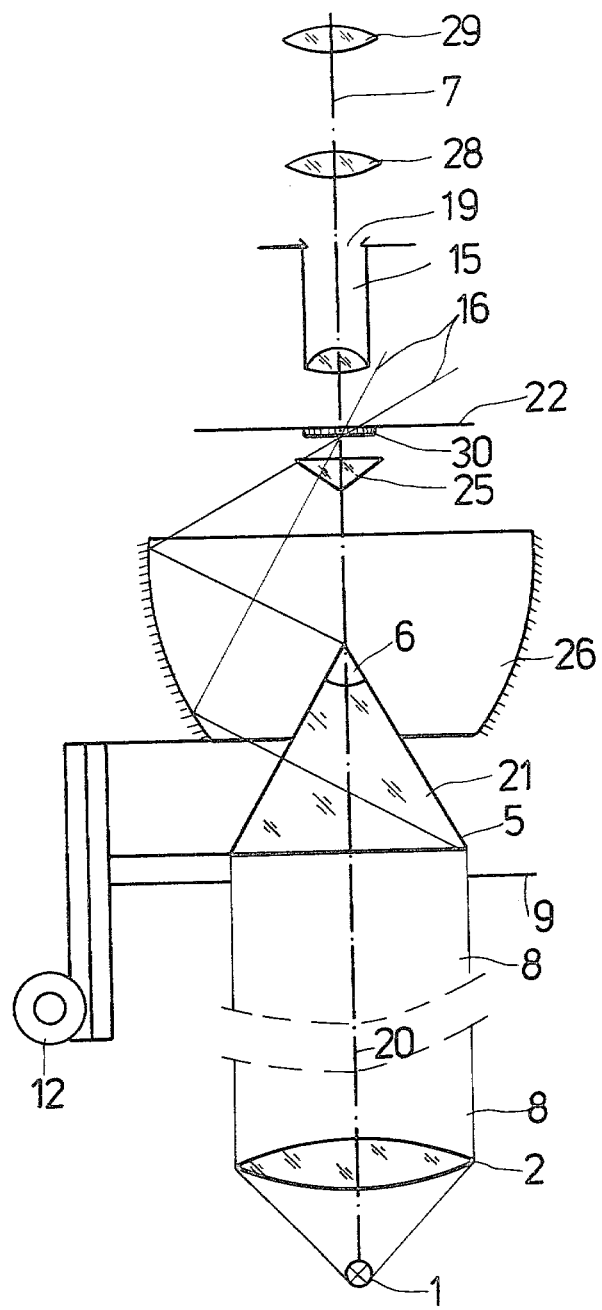

In order that the invention may be more readily understood reference is made to the accompanying drawings which illustrate diagrammatically and by way of example four embodiments thereof and where FIG. 1 shows an illumination arrangement for incident light, FIG. 2 is an illumination arrangement for reflected light, FIG. 3 an illumination arrangement for reflected light employing a truncated cone, FIG. 4 an illumination arrangement for reflected light employing a final glass member.

According to FIG. 1 a light source 1 emitting a bundle of beams 8 is followed by a collimating lens 2 and a short focal positive lens 3 which serves to increase the aperture and can be switched out of or into the bundle of beams 8 substantially at right angles to the latter by a not shown means. The positive lens 3 is displaceable along an optical axis 20 by a drive mechanism 4, the diameter of the positive lens 3 corresponds to that of the bundle of beams 8 as transmitted by the collimating lens 2. Adjacent the positive lens 3 an iris diaphragm 9 is arranged followed by an optical cone 5, which is partially enveloped by a toroidal reflecting face of a truncated reflecting cone 10. The toroidal face totally reflects an illumination beam 16 which is that portion of the bundle of beams 8 which impinges almost perpendicular upon the base face of one cone 5, that is, only slightly inclined relative to said axis 20. Furthermore, an annular lens 11, an annular reflector 13 and an annular codenser reflector 23 finalizing a dark-field channel 14 of an incident light objective 15 establish the dark-field illumination system.

Subsequent to the optical cone 5 a collimating lens 18 which serves as a light centering system is arranged about the optical axis 20 for focussing a light bundle 24 into a phase ring plane 19 of the incident-light objective 15 via a subsequent beam splitting reflector 17. The light bundle 24 is the continuation of the portion of the bundle of beams 8, which after passing the lens 3 is more severely inclined relative to the optical axis 29.

Furthermore, a tube lens 28 and an eyepiece 29 are arranged about an optical axis 7 of an imaging path of beams, the optical axis 7 and the optical axis 20 intercept in the plane of the beam splitter 17.

In operation, the bundle of beams 8 originating from the light source 1 and directed by the collimating lens 2 has a low aperture and with the positive lens 3 switched out of the beams 8 is totally reflected at the shell 21 of the optical cone 5 towards the opposing cone shell face.

The bundle of beams 16 leaving the optical cone 5 is subsequently deviated at the truncated cone reflector 10 to impinge upon the annular reflector 13 from where the beams 16 are directed to the dark-field channel 14; the annular condenser reflector 23 focusses the beams 16 into a setting plane 22 of the imaging path of beams 7. The annular lens 11 serves to adapt the width of the annular ring to the annular reflector 13 and to the dark-field channel 14.

When the positive lens 3 is inserted into the bundle of beams 8 by means of a tilting mechanism 32 those portions of said beams which are not too severely inclined remain unvaried.

The more strongly inclined beams considered with respect to the optical axis 20 are refracted at the cone 5 whereas the poorly inclined portions, or parallel ones are totally reflected.

The angle of aperture 6 of the cone 5 and the focal length of the lens 3 are mutually matched. The lens 18 focusses the bundle of beams 24 after having been deviated at the beam splitting reflector 17 into the phase ring plane 19.

The diameter of the illuminated ring in the phase ring plane 19 is varied by displacing the positive lens 3. In this manner it is feasible with the positive lens 3 inserted to realise at the same time phase contrast illumination and dark-field illumination. The brightness of the phase contrast and dark-field image is varied and mutually matched by operating the iris diaphragm g.

The reflected light arrangement of FIG. 2 corresponds to that of FIG. 1 from the light source 1 on to the cone 5 and the truncated cone reflector 10. The diameter of the lens 3 has been selected smaller than that of the light bundle 8 originating from the light source 1 and directed by the collimating lens 2.

The condenser unit comprising the positive lens 3, the cone 5 and the truncated cone reflector 10 is displaceable along the optical axis by means of an additional drive mechanism 12 and serves to adjust the maximum light concentration of the dark-field illumination in the setting plane 22.

The object 30 is arranged in the setting plane 22 followed by the imaging members, the objective 15, the tube lens 28 and the eyepiece 29.

Apart from its imaging function the objective 15 has the task to focus the bundle of beams 24 into the vicinity of the phase ring plane 19.

This arrangement can be supplemented by an annular lens provided between the toroidal reflecting face 10 and the setting plane 22 and by an additional rotation symmetrical deviating member effective upon the path of beams 24.

In FIG. 3 a truncated cone 27 serves to increase the aperture instead of the positive lens 3 in FIGS. 1 and 2.

The truncated cone 27 is matched to the objective 15, and both are commonly exchangeable.

When two phase rings have to be illuminated a truncated double cone and a bifocal Fresnel lens, respectively, or an annular lens in cooperation with a positive lens can be employed.

The truncated reflecting cone 10 of FIG. 2 is replaced in this embodiment by a toroidal reflecting face 26 having a finite radius of curvature.

In the arrangement of FIG. 4 which is intended for use in reflected light the aperture increasing system is switched off.

The entire condensor unit is supplemented by a plano-convex optical element 25 which serves as an additional deflecting and collimating system for the phase contrast illumination.

The cone 5 includes a beam splitting face to render the object illumination homogeneous.

Said beam splitting face coincides with the axis of symmetry of the cone 5 indicated by the dash-point line in said cone.

I claim:

1. An illumination arrangement for microscopes for illumination of a microscopic sample in reflected light and transmitted light permitting a simultaneous and alternating dark-field and phase contrast illumination
   comprising in optical alignment and considered in direction of light propagation
   a light source for emitting light beams,
   a condenser lens for shaping said light beams into a bundle of light,
   an optical system for aperture increase,
   a diaphragm for limiting said bundle of light,
   an optical cone for splitting said bundle of light into a totally reflected beam portion and into a refracted beam portion,
   said optical cone being provided with a base face in opposition to said diaphragm,
   a toroidal face for reflecting said totally reflected beam portion,
   a setting plane for arranging said sample therein,
   said totally reflected beam portion and said refracted beam portion being directed onto said sample in said setting plane.

2. An illumination arrangement as claimed in claim 1, wherein said optical system for aperture increase is a collimating lens.

3. An illumination arrangement as claimed in claim 1, wherein said optical system for aperture increase is a truncated optical cone having its base face in opposition to said optical zone.

4. An illumination arrangement as claimed in claim 1, wherein means are provided for displacing said optical system for aperture increase in parallel to the direction of light.

5. An illumination system as claimed in claim 1, wherein means are provided for displacing said optical system for aperture increase substantially at right angles to the direction of light.

6. An illumination system as claimed in claim 1, wherein the opening of said diaphragm is variable.

7. An illumination system as claimed in claim 1, wherein between said toroidal face and said setting plane are provided, considered in direction of light propagation, a further collimating lens for said refracted beam portion, an annular lens substantially coaxially to said further collimating lens for said totally reflected beam portion, a beam splitting reflector for folding said refracted beam portion, an annular reflector in the plane of and including said beam splitting reflector for folding said totally reflected beam portion, an objective for said refracted beam portion, a further annular reflector for said totally reflected beam portion, said further annular reflector substantially enveloping said objective, said setting plane being identical to the object plane of said objective.

8. An illumination system as claimed in claim 7, wherein said objective being combined with a phase ring aperture and being simultaneously the microscope objective.

* * * * *